United States Patent [19]
Bogdanovich

[11] 3,862,766
[45] Jan. 28, 1975

[54] TANDEM RUNNER BOB SLED

[76] Inventor: Andrew Carlyle Bogdanovich, 1691 Edgewater La., Camarillo, Calif. 93010

[22] Filed: Feb. 15, 1974

[21] Appl. No.: 443,132

[52] U.S. Cl. .................................. 280/16, 280/21 R
[51] Int. Cl. ........................................... B62b 13/04
[58] Field of Search ...................... 280/16, 15, 21 R

[56] References Cited
UNITED STATES PATENTS
2,109,826  3/1938  McCleary ............................. 280/16
2,470,448  5/1949  Warrender ........................... 280/16
FOREIGN PATENTS OR APPLICATIONS
926,528  10/1947  France ................................. 280/16

Primary Examiner—Robert R. Song
Attorney, Agent, or Firm—John E. Kelly; Pastoria & Kelly

[57] ABSTRACT

A low profile bob sled has tandem runners, a front one being steerable and the rear one being rigid. A support framework carries a belly board. The front runner is pivotally coupled to a steering column for floating over a snow surface and can be laterally turned with the steering column. A steering bar extends through the steering column and is aligned fully beneath the plane of the belly board.

9 Claims, 8 Drawing Figures

PATENTED JAN 28 1975
3,862,766
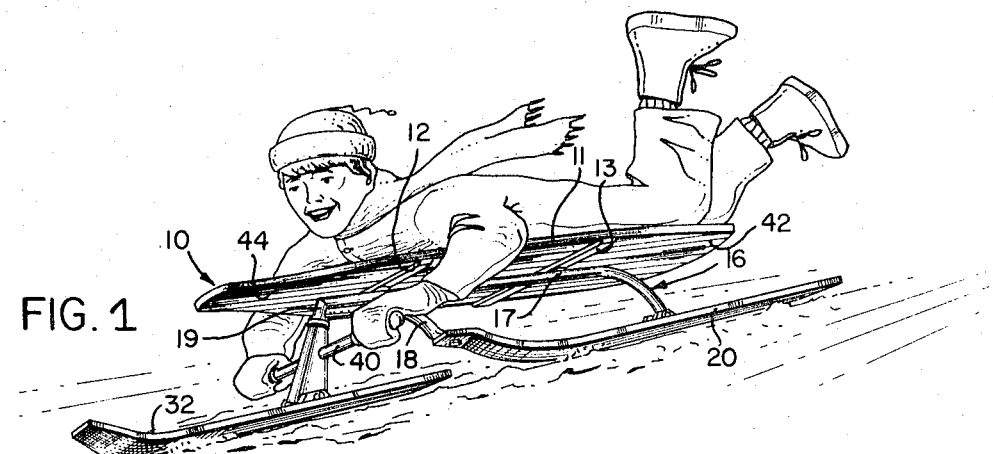
FIG. 1
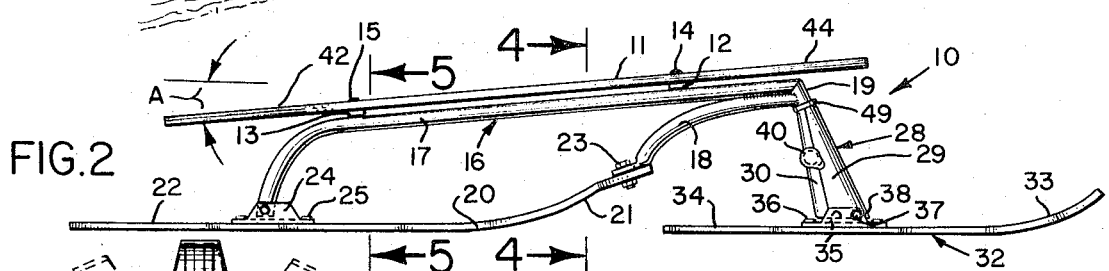
FIG. 2
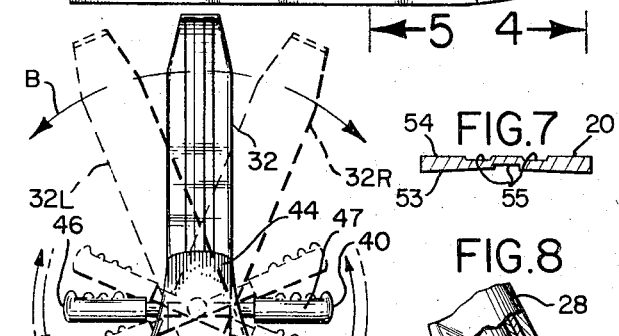
FIG. 3
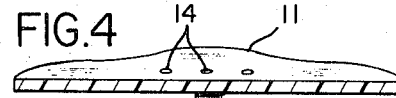
FIG. 7
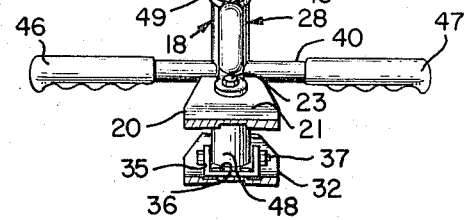
FIG. 8
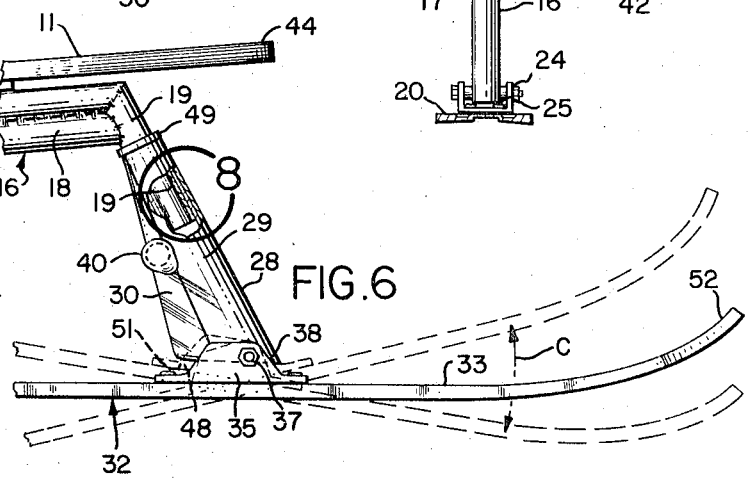
FIG. 4
FIG. 5
FIG. 6

3,862,766

TANDEM RUNNER BOB SLED

BACKGROUND OF THE INVENTION

This invention relates generally to snow-traversing sports equipment and particularly to bob sleds.

Conventional bob sleds differ from sleds in that they generally include a pair of longitudinally spaced sleds interconnected by a board for supporting people. A steering mechanism is frequently included to guide the bob sled over snow and/or ice-covered surfaces.

Some bob sleds have articulated front and rear sections linked by a steering mechanism so that any angular movement to one side by the front section will automatically result in opposite angular movement by the rear section - in order to facilitate turnings. See U.S. Pat. No. 2,525,833 to Schiffbauer (1950).

Steering bars or wheels are customarily positioned above the support or belly board as disclosed in U.S. Pat. Nos. 245,571 to Shepard (1881), 1,431,826 to Lovett (1922), and 2,095,951 to Andrus (1937).

Also the fore and aft sections of conventional bob sleds generally each have double runners or skis as disclosed in U.S. Pat. Nos. 2,353,501 to Redling (1944) and 3,583,722 to Jacobson (1971).

Certain variations of bob sleds sometimes referred to as ski-bobs mount skis on bicycle-like chassis as described in U.S. Pat. No. 3,526,412 to Garcia (1970).

SUMMARY OF THE INVENTION

Briefly stated, this invention relates to a low profile easily assembled and relatively inexpensive bob sled with tandem runners.

In its broader aspects the bob sled has a supporting framework which includes a depending strut. A stationary rear runner is fixed to the support framework and has a generally ski-shaped forward portion and straight rearward portion.

A belly board is connected along its longitudinal center line to the support framework and, with respect to the plane of the straight rearward portion of the rear runner, is inclined upwardly and forwardly between five and fifteen degrees.

A rearwardly inclined steering column is swivelly coupled to the strut. A steering bar connected to the steering column is aligned fully beneath the plane of the belly board and is generally perpendicular to the strut.

A front runner aligned tandemly with respect to the rear runner is pivotally coupled to a bottom portion of the steering column. The front runner may be simultaneously turned with the steering column in response to rotation of the steering bar.

Preferably the steering column includes a sleeve slipped over the strut and a web that mounts the steering bar.

The web is positioned behind the sleeve and a restraining collar is secured to the strut and positioned to engage the sleeve. Handle grips are coupled to the oppositely extending ends of the steering bar.

A front bracket pivotally interconnects the front runner and steering column and this bracket and the steering column are spaced from one another. Stop means is defined by a forward bottom part of the steering column and is positioned so as to engage the front runner and prevent it from pivoting upwardly beyond the general plane of the belly board.

The belly board is configured with a relatively wide rear portion, a forwardly tapering middle portion and a relatively narrow forward portion that defines side spaces in order to accommodate a person's arms as he attempts to hold the steering bar.

BRIEF DESCRIPTION OF THE DRAWINGS

The numerous benefits and unique aspects of the present invention will be fully understood when the following detailed description is studied in conjunction with the drawings in which:

FIG. 1 is a perspective view from beneath a tandem runner bob sled constructed in accordance with this invention, showing a boy lying on the belly board and maneuvering the bob sled;

FIG. 2 is a side elevational view of the bob sled;

FIG. 3 is a top plan view of the bob sled with phantom lines indicating changed positions of the front runner;

FIG. 4 is a front sectional view taken along line 4—4 of FIG. 2;

FIG. 5 is a rear sectional view taken along line 5—5 of FIG. 2;

FIG. 6 is a side elevational and fragmentary view of a front portion of the bob sled, showing changed vertical positions of the front runner in phantom lines;

FIG. 7 is a cross sectional view of the rear runner taken along lines 7—7 of FIG. 3; and, FIG. 8 is an enlarged detailed view of the steering column as shown in smaller scale in FIG. 6.

DETAILED DESCRIPTION OF THE PREFERRED EMBODIMENT

Referring now to the drawings and FIG. 1 in particular, a tandem runner bob sled 10 constructed in accordance with this invention, has a relatively low slung belly board 11 coupled with the aid of underlying fore and aft cross strips 12 and 13 to a rigid support framework 16 arranged generally within a vertical plane.

Support framework 16 incorporates an elongated member 17 that is generally straight but has a curled down tail section and a depending stub strut 19. A diagonal member 18 extends rearwardly from the juncture of elongated member 17 and the depending strut 19.

A rear runner 20 has a straight rearward portion 21 and a front portion 22 that is ski-shaped. The front portion 22 of rear runner 20 is secured to diagonal member 18 by way of a conventional connector 23. Runner 20 is fixed to framework 16 by a bracket 24 and plurality of rivets 25.

A steering column 28 is swivelly coupled to the depending strut 19. Steering column 28 has a sleeve 29 that is slipped over strut 19 and a web 30 positioned behind the sleeve 29.

A front runner 32, tandemly aligned relative to rear runner 20 has a front portion 33 that is ski-shaped and a rear portion 34. Front runner 32 is pivotally coupled to a bottom portion of the steering column 28 by a pivot pin that extends through a bracket 35 secured to runner 32 by conventional rivets 36 or the like.

Stop means 38 is formed by a forward bottom part of the steering column 28. A steering bar 40 is connected to the steering column 28 and aligned fully beneath the plane of the belly board 11 and is generally perpendicular to the axis of strut 19.

Referring to FIG. 2 primarily the general plane of the belly board 11 is inclined upwardly and fowardly relative to the straight rearward portion 22 of rear runner 20 by an angle A between five and fifteen degrees. This sloping of the belly board assists the person in maintaining improved balance and maneuverability as well as comfort, especially during downhill movement.

Referring primarily to FIG. 3 the belly board 11 has a generally broad and rectangular rear portion 42, a tapering or delta-shaped intermediate portion 43 and a relatively narrow front portion 44. The side edges of belly board front portion 44 assist in defining side spaces to accommodate a person's arm as he is attempting to hold or is actually holding the oppositely extending ends of steering bar 40

By grasping and manipulating steering bar 40 the front runner 32 may be turned through a broad arc of rotation indicated by designation B. Phantom lines 32L and 32R represent the front runner 32 turned to the left and right respectively.

The opposing ends of the steering bar 40 carry handle bars 46 and 47 with their generally lower and forward edges formed with contoured finger grips. The handle bars may be mechanically connected to, welded to, or integrally formed with the main body of the steering bar 40.

FIGS. 2 and 3 show conventional rivets or screws 14 and 15 connecting the cross strips 12 and 13 to the support framework 16. The belly board 11 is connected along its longitudinal center line to the support framework 16.

Referring to FIG. 4 the lower part 48 of the steering column 28 is spaced from the base portion of bracket 35.

Referring primarily to FIGS. 6 and 8, a bushing 50 is inserted within the sleeve 29 of steering column 28 to facilitate rotation. The restraining collar 49 is fixed to strut 19 and serves to engage and stop upward movement of sleeve 29.

The steering column base 48 and bracket 35 are separated by a space 51 to allow some vertical movement by front runner 32. The stop means 38 formed by a forward bottom portion of steering column 28 is positioned so as to engage the front runner 32 and prevent it from pivoting upwardly beyond the general plane of the belly board 11. The general range of vertical pivoting movement by front runner 32 is indicated by designation C. The phantom lines show the extreme positions that can be assumed by front runner 32. The tip 52 of front runner 32 is prevented by the stop means 38 from swinging or flipping up to a height where it might strike and injure or interfere with the person operating the bob sled 10.

FIG. 7 shows that rear runner 20 has an undersurface 53 that is slightly cambered and a top surface 54 - both of which are formed with grooves 55 to improve tracking and maneuverability.

OPERATION

Keeping the above construction in mind it can be understood how this tandem runner bob sled offers many improvements over the bob sleds previously described.

To use the bob sled 10 a person such as a boy may make a running start or start from a dead stop and position himself belly down on the belly board 11 with his arms straddling the front portion 44 and his hands grasping the handle bars 46 and 47.

Because the bob sled 10 is so low slung, the center of gravity is relatively low which aids in stability.

The stationary rear tandem runner 20 tracks the front tandem runner 32 and both operate together much like a single ski.

The front runner is mechanically arranged to generally float over the snow slopes as the steering column 28 is maneuvered through pre-determined or spontaneous turning movements.

Stop means 38 prevents the front runner 32 from accidentally flipping upwardly and striking the person. A further safety factor results from positioning the steering bar 40 in back of the steering column sleeve 29 and this arrangement furthermore provides the person with improved leverage for rotating the steering column 28. The floating action of the front runner prevents its tip 52 from nosing into the snow.

The chassis of support framework 16 is constructed from rugged dependable materials. The runners 20 and 32 may be constructed from anodized aluminum. The overall bob sled 10 is of lightweight construction for use by people of all ages and experience.

From the foregoing it will be evident that the present invention has provided a tandem runner bob sled in which all of the various advantages are fully realized.

What is claimed is:

1. A sled comprising:
   a. a support framework including a depending strut;
   b. a stationary rear runner fixed to the support framework and having a ski shaped forward portion and straight rearward portion.
   c. a belly board connected along its longitudinal center line to the support framework, the plane of the belly board being inclined upwardly and forwardly between five and fifteen degrees with respect to the plane of the straight rearward portion of the rear runner;
   d. a rearwardly inclined steering column swivelly coupled to the strut;
   e. a steering bar connected to the steering column and aligned fully beneath the plane of the belly board and generally perpendicular to the strut;
   f. a front runner aligned tandemly with respect to the rear runner and pivotally coupled to a bottom portion of the steering column, the front runner being arranged for being simultaneously turned with the steering column in response to rotation of the steering bar;
   g. a sleeve slipped over the strut;
   h. a web that mounts the steering bar and is positioned behind the sleeve;
   i. a restraining collar secured to the strut and positioned to engage the sleeve; and,
   j. handle grips coupled to the oppositely extending ends of the steering bar.

2. The structure according to claim 1, including:
   a. a front bracket pivotally interconnecting the front runner and steering column, the bracket and steering column being spaced; and,
   b. stop means defined by a forward bottom part of the steering column, positioned to engage the front runner and prevent it from pivoting upwardly beyond the general plane of the belly board.

3. The structure according to claim 1, wherein the support framework includes:
   a diagonal member connected to the ski shaped forward portion of the rear runner.

4. The structure according to claim 1, wherein:

the belly board has a relatively wide rear portion, a forwardly tapering middle portion and a relatively narrow forward portion defining side spaces for accommodating a person's arms while he is holding the steering bar.

5. A sled comprising:
a. a support framework including a depending strut;
b. a stationary rear runner fixed to the support framework and having a ski shaped forward portion and straight rearward portion;
c. a belly board connected along its longidutinal center line to the support framework, the plane of the belly board being inclined upwardly and forwardly between 5 and 15° with respect to the plane of the straight rearward portion of the rear runner;
d. a rearwardly inclined steering column swivelly coupled to the strut;
e. a steering bar connected to the steering column and aligned fully beneath the plane of the belly board and generally perpendicular to the strut;
f. a front runner aligned tandemly with respect to the rear runner and pivotally coupled to a bottom portion of the steering column, the front runner being arranged for being simultaneously turned with the steering column in response to rotation of the steering bar;
g. a front bracket pivotally interconnecting the front runner and steering column, the bracket and steering column being spaced; and,
h. stop means defined by a forward bottom part of the steering column, positioned to engage the front runner and prevent it from pivoting upwardly beyond the general plane of the belly board.

6. The structure according to claim 5, wherein the steering column includes:
a sleeve slipped over the strut and a web that mounts the steering bar.

7. The structure according to claim 5, wherein:
a. the web is positioned behind the sleeve;
b. a restraining collar is secured to the strut and positioned to engage the sleeve; and,
c. handle grips are coupled to the oppositely extending ends of the steering bar.

8. The structure according to claim 5, wherein the support framework includes:
a diagonal member connected to the ski shaped forward portion of the rear runner.

9. The structure according to claim 5, wherein:
the belly board has a relatively wide rear portion, a forwardly tapering middle portion and a relatively narrow forward portion defining side spaces for accommodating a person's arms while he is holding the steering bar.

* * * * *